United States Patent [19]

Schwefel

[11] 4,330,831
[45] May 18, 1982

[54] CORRECTION SELECTION DEVICE

[75] Inventor: Ernst Schwefel, Traunreut, Fed. Rep. of Germany

[73] Assignee: Dr. Johannes Heidenhain GmbH, Traunreut, Fed. Rep. of Germany

[21] Appl. No.: 86,327

[22] Filed: Oct. 19, 1979

[30] Foreign Application Priority Data

Oct. 24, 1978 [DE] Fed. Rep. of Germany ....... 2846170

[51] Int. Cl.$^3$ ....................... G06F 15/46; G05B 19/25
[52] U.S. Cl. ..................................... 364/474; 318/572; 364/170
[58] Field of Search ....................... 364/474, 475, 120; 318/572, 632

[56] References Cited

U.S. PATENT DOCUMENTS

| | | | |
|---|---|---|---|
| 3,073,998 | 1/1963 | Bower | 318/572 |
| 3,211,896 | 10/1965 | Evans et al. | 318/608 X |
| 3,430,035 | 2/1969 | Read | 364/111 X |
| 3,532,954 | 10/1970 | Meyer | 318/572 |
| 3,646,419 | 2/1972 | Holy et al. | 318/572 X |
| 3,846,680 | 11/1974 | Guerci et al. | 318/572 X |
| 3,866,027 | 2/1975 | Cutler et al. | 318/572 |
| 4,007,411 | 2/1977 | Saito | 318/572 X |

FOREIGN PATENT DOCUMENTS

| | | | |
|---|---|---|---|
| 995648 | 6/1965 | United Kingdom | 364/474 |
| 1064258 | 4/1967 | United Kingdom | 364/474 |

OTHER PUBLICATIONS

Morse et al.—*Numerically Controlled Machine Tools;* pp. 172-175, 1965—American Data Processing, Inc., Detroit.

Wilson—*Numerical Control in Manufacturing*—McGraw-Hill, New York, pp. 118-129, 198-205, 302-315, 490-497; 1963.

Heidenhain-TNC 121-Position and Linear Path Control-pp. 1-9, Heidenhain Corp. USA, Elk Grove Village, Illinois.

Electronic Industries Association Publication-EIA Standard-Rs-273-A-"Interchangeable Perforated Tape Variable Block Format for Positioning and Straight Cut Numerically Controlled Machines", May—1967, pp. 1-13, Electronic Industries Association, Washington, D.C.

ISO Recommendation R1056—"Punched Tape Block Formats for the Numerical Control of Machines–Coping of Prepatory Functions G and Miscellaneous Functions M", 1st Edition, Apr. 1969—pp. 1-15—International Organization for Standardization—printed in Switzerland.

ISO Recommendation R1058—"Punched Tape Variable Block Format for Positioning and Straight Cut Numerically Controlled Machines—1st Edition, Apr. 1969—pp. 1-15, International Organization for Standardization—printed in Switzerland.

Tschumi—"Tool Radius Correction for True Contour Programming"—Brown Boveri, rev. vol. 57, 11-7-0—pp. 456-459.

*Primary Examiner*—Joseph F. Ruggiero
*Attorney, Agent, or Firm*—Hume, Clement, Brinks, Willian & Olds, Ltd.

[57] ABSTRACT

In a numerically controlled machine tool including a scale, a scanning unit, and a programmable controller a switch is provided to designate the tool correction to be applied to compensate for variations in tool dimensions. This switch has a first position, in which the controller is directed to lengthen the tool path length by an amount corresponding to the tool correction, a second position, in which the controller is directed to shorten the tool path length by an amount corresponding to the tool correction, and a third position, in which the controller is directed to apply no tool corrections to the tool path length.

6 Claims, 5 Drawing Figures

CORRECTION SELECTION DEVICE

BACKGROUND OF THE INVENTION

The present invention relates generally to control devices for determining the relative position of two objects, and particularly to a correction selection device which allows operating personnel to simply select the correction value to be used by the control device.

In numerically controlled machines, such as machine tools, for example machine operation is controlled by a programmed controller. The programmed controller directs a forming tool to predetermined positions, as established by the desired dimensions of the finally tooled workpiece. In addition to the desired dimensions of the finished workpiece, variations in tool geometry must be taken into consideration in determining the path of the forming tool commanded by the controller. Such tool geometry corrections are known as tool radius corrections or, in brief, tool corrections. "Numerical Control in Manufacturing", 1963 by Frank W. Wilson, McGraw-Hill Book Company, New York, Library of Congress Catalog Card Number: 63-15105; and "Numerically Controlled Machine Tools", 1965 by Morse and Cox, Published by American Data Processing, Inc., Detroit, Library of Congress Catalog Card Number: 65-21222 provide further information as to the state of the art.

Because numerically controlled machines preferably form the workpiece, insofar as possible, automatically and without manual intervention, a programmed controller is used to determine coordinates of the tooled workpiece. Corrections which are due to differing tool dimensions are often entered manually. Thus, for example, the radius of a milling tool is often added to or subtracted from the desired workpiece dimension as necessary. The sign (plus or minus) of the specific coordinates and the direction of movement of the tool or of the workpiece are critically important in determining the proper tool correction, and such corrections should be made in accordance with standard specifications (see, e.g., West German Normblatter DIN No. 66 025, Beuth-Vertrieb GmbH, Berlin, West Germany). Similarly, in computing the tool correction it must be taken into account whether the tool moves on an outside edge of the workpiece or in a tool recess along the tooling path. Because tool correction is a function of such constantly changing variables as workpiece geometry and feed direction, the operator must use great care in determining tool corrections. Erroneous tool corrections are frequently the cause of serious mistakes which can irretrievably damage workpieces.

SUMMARY OF THE INVENTION

The present invention is directed to a device which can be simply operated to reduce the frequency of errors in the determination of tool corrections by substantially reducing the complexity of tool correction determination. This invention substantially reduces the reflection required by operating personnel to correctly specify tool corrections.

According to this invention, a control device is provided with switching means by which operating personnel can indicate whether the tool path length is to be shortened or lengthened. The control means responds to this switching means by either lengthening or shortening the programmed tool path by a previously stored tool correction, or by applying no tool correction.

This invention provides the important advantage that the operator is freed from all types of calculations or manipulations of algebraic signs. Instead of specifying the desired tool correction in terms of algebraic sign, the operator merely indicates whether the tool path length is to be lengthened or shortened. This relatively simple decision can be made reliably and quickly from simple geometrical considerations, without resort to conventions of algebraic sign and the like.

The invention, together with further objects and attendant advantages, will be best understood by reference to the following detailed description taken in connection with the accompanying drawings.

DETAILED DESCRIPTION OF PREFERRED EMBODIMENT

Figure 1:
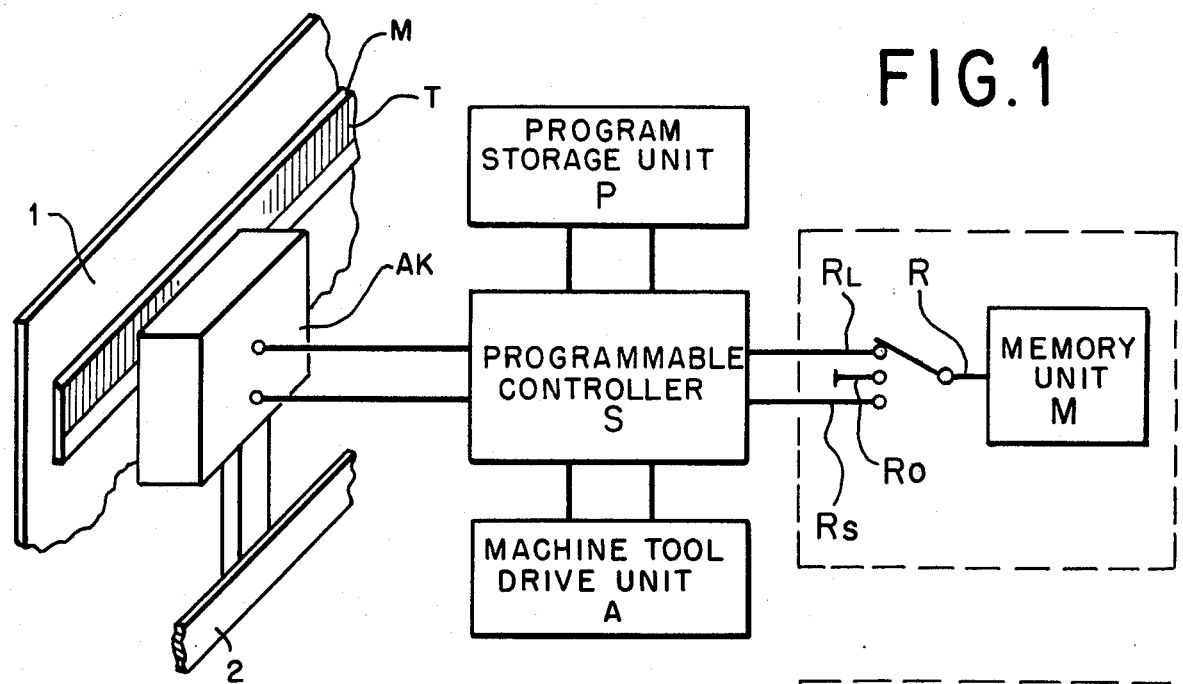
FIG. 1 is a schematic representation of a first preferred embodiment of the invention.

Referring now to the drawings, FIG. 1 shows an incremental measuring system in which is provided with a scale T that is fastened in a known manner to a machine tool component 1. A scanning head AK is mounted to a second machine tool component 2 so as to scan the incremental scale T when a relative movement occurs between the machine tool components 1 and 2. This relative movement can be controlled by a drive unit A, which is controlled by a programmable controller S. In the controller S instructions from a program storage unit P and signals generated by the incremental measuring system MT, AK are processed to generate desired tool coordinates for the machine tool. Alternately, the controller S may control the machine tool via the drive unit A to move the forming tool to the desired position. In addition to the program storage unit P, there is also provided a memory unit M, which stores tool correction values $M_R$. This memory unit M can include either an electronic memory unit or conventional preselection switches for entering and storing correction values.

Ordinarily, the coordinates of the finally tooled workpiece and the commands for determining machine tool operation are stored in the program storage unit P. Since, however, differences in the geometry of the tool center paths of different tools cannot always be taken into account in the programmed tool coordinates, the tool-radius correction values $M_R$ are retained in the memory unit M and recalled when needed.

The recall of tool correction values is often a source of problems for operating personnel. In particular, the correct choice of the sign (plus or minus) for the tool correction value $M_R$ in respect to the sign of the particular coordinates is a function of the direction of movement of the tool with respect to the workpiece, as well as whether inner or outer edges are being machined. After the direction of the machine tool movement has reversed several times, the correct choice of sign may no longer be simple to determine. The difficulties are also apparent from the above-cited West German Normblatter DIN 66025, sheet 2, pages 2 and 3, positions G40 to G52.

Switch R is coupled between controller S and correction value memory unit M to facilitate the correct determination of the proper tool correction value $M_R$ by operating personnel. Switch R is a three position switch, and in order to use this switch, the operator needs merely to determine whether the desired tool position is shifted and, for this reason, the tool travel distance must be shortened or lengthened by the tool radius. A sign calculation is not required. Each position of the three-position switch R between controller S and memory unit M is clearly and symbolically marked. This makes it possible for the operator to clearly and rapidly select the proper switch position.

Thus, the symbol $R_O$ stands for tool control without tool correction. In this position, no tool correction is supplied. The symbol $R_S$ stands for "short" travel movement; in this position the machine tool is positioned to the programmed coordinate value minus tool radius. The symbol $R_L$ stands, accordingly, for "long" travel movement; in this position the machine tool is positioned to the programmed coordinate value plus tool radius. Based on the instantaneous movement of the machine tool, which is easy for the operator to check at any time, the operator can easily conclude whether the machine tool travel has to be shortened or lengthened by the amount of the tool radius, and the goal position can be correspondingly shifted. Furthermore, this conclusion can be made reliably without a great chance of error.

Figure 1A:
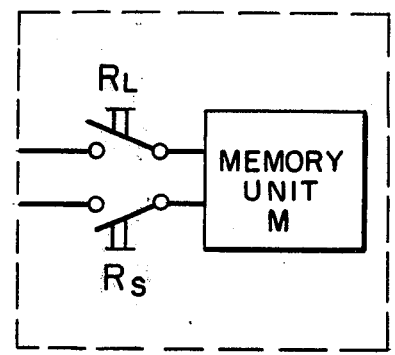
FIG. 1a is a schematic representation of a portion of a second preferred embodiment.

FIG. 1a shows a second preferred embodiment of the selection switch, which is here realized by two pressure switches $R_S$ and $R_L$. If desired, a control light may be provided for each switch $R_S, R_L$ to indicate in which state the memory unit M is operating. The function of switches $R_S, R_L$ is the same as that of the arrangement according to FIG. 1, except that the position $R_O$ is generated by decoupling the memory unit M by means of the two switches $R_S$ and $R_L$.

Figure 2:
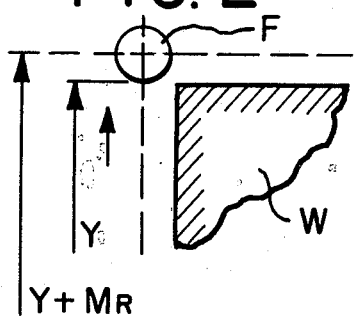
FIG. 2 represents geometrical conditions in outeredge tooling of a first workpiece section.
Figure 3:
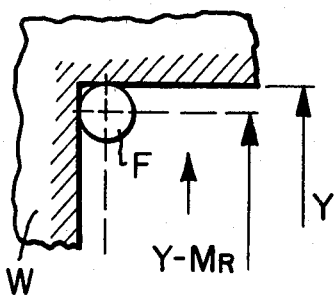
FIG. 3 represents geometrical conditions in inneredge tooling of a second workpiece section.

FIGS. 2 and 3 show geometric conditions encountered during machining of outer and inner edges in the simplest case. A workpiece W is to be milled on one edge to the measure Y with a milling tool F. The milling tool is moved in the direction shown by the arrow. This movement is perceived by the operating personnel and the switch position $R_L$ for the tool correction is chosen, since the milling tool path must be lengthened by the milling tool radius $M_R$, to ensure an exact tooling to the dimension Y. Thus, the computation $Y + M_R$ does not have to be carried out by the operating personnel.

In FIG. 3 there is shown a similar situation, in which the switch position $R_S$ must be chosen, since the milling tool path is to be shortened by the milling tool radius $M_R$. Once again, the computation $Y - M_R$ does not have to be carried out by the operating personnel.

Figure 4:
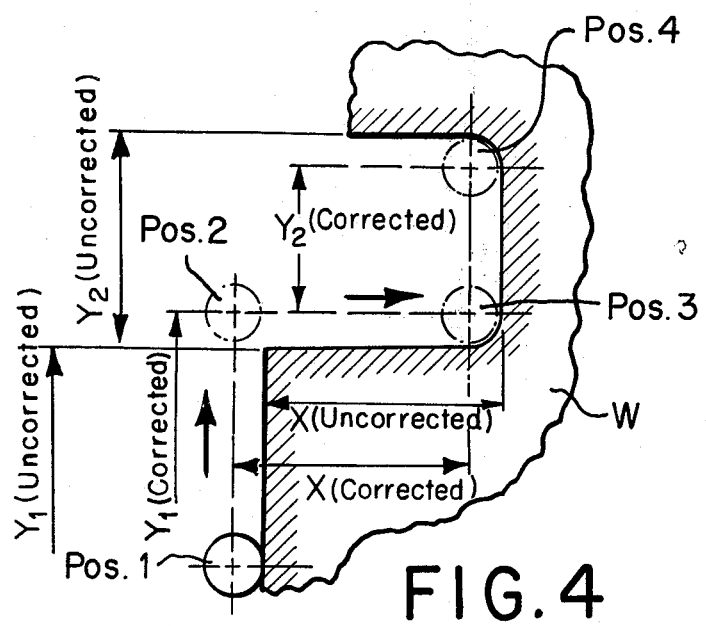
FIG. 4 represents geometrical conditions in tooling a third workpiece section.

FIG. 4 shows a somewhat more complex example, in which sign selection for the tool correction would have to be carried out carefully by the operating personnel if done by conventional methods.

However, with the present invention, only the next tool destination must be considered in order to select the proper correction switching position. In order to pass from Position 1 to Position 2, correction switch $R_L$ must be selected to lengthen tool travel. In order to pass from Position 2 to Position 3, or from Position 3 to Position 4, correction switch $R_S$ must be selected to shorten tool travel. In this way, the length of the center path of the milling tool travel does not have to be computed by operating personnel.

The simple examples of FIGS. 2, 3 and 4 are meant to serve only as an aid to explanation of the invention. In general, extremely complicated workpieces are processed on numerically controlled machines and it is primarily with such complex workpieces that the full advantage of the invention is realized.

Of course, it should be understood that various changes and modifications to the preferred embodiments described herein will be apparent to those skilled in the art. Such changes and modifications can be made without departing from the spirit and scope of the present invention, and without diminishing its attendant advantages. It is, therefore, intended that such changes and modifications be covered by the following claims.

I claim:

1. In a control system for positioning a tool with respect to a workpiece, said system including control means for automatically and sequentially moving the tool along a sequence of tool paths with respect to the workpiece, the improvement comprising:
    means, coupled to the control means, for storing a tool correction value;
    switching means, coupled to the control means and adapted to be manually operated while the control means sequentially moves the tool, for designating an effective tool correction to be used by the control means to modify the lengths of selected ones of the sequence of tool paths;
    said switching means being manually switchable between a first state, in which the control means is always caused to lengthen a tool path included in the sequence of tool paths by an amount corresponding to the tool correction value; a second state, in which the control means is caused to always shorten a tool path included in the sequence of tool paths by an amount corresponding to the tool correction value; and a third state, in which the control means is always prevented from using the tool correction value to modify a tool path included in the sequence of tool paths;
    said switching means operative to permit an operator to alter the lengths of selected tool paths manually without resort to considerations of algebraic sign.

2. The improvement of claim 1 wherein the switching means comprises a switch having a plurality of switching positions.

3. The improvement of claim 1 wherein the switching means comprises a plurality of switches.

4. In a control system for positioning a tool with respect to a workpiece, said system including control means for automatically and sequentially moving the tool along a sequence of tool paths with respect to the workpiece, the improvement comprising:
    means, coupled to the control means, for storing a tool correction value;
    switching means, coupled to the control means and adapted to be manually operated while the control means sequentially moves the tool, for designating an effective tool correction to be used by the control means to modify the lengths of selected ones of the sequence of tool paths, said switching means being manually switchable between a first state, indicative of lengthened tool path, a second state, indicative of shortened tool path, and a third state, indicative of unaltered tool path;

first means, included in the control means and responsive to the switching means, for always lengthening a tool path included in the sequence of tool paths when the switching means is in the first state by an amount corresponding to the tool correction value;

second means, included in the control means and responsive to the switching means, for always shortening a tool path included in the sequence of tool paths when the switching means is in the second state by an amount corresponding to the tool correction value; and third means, included in the control means and responsive to the switching means, for always preventing tool correction to a tool path included in the sequence of tool paths when the switching means is in the third state;

said switching means, first means, second means and third means cooperating to permit an operator to alter the lengths of selected tool paths manually without resort to considerations of algebraic signs.

5. The improvement of claim 4 wherein the switching means comprises a switch having a plurality of switching positions.

6. The improvement of claim 4 wherein the switching means comprises a plurality of switches.

* * * * *